June 6, 1944.  A. E. LECHLEITNER  2,350,780
FILM GUIDING ASSEMBLY
Filed Dec. 3, 1942
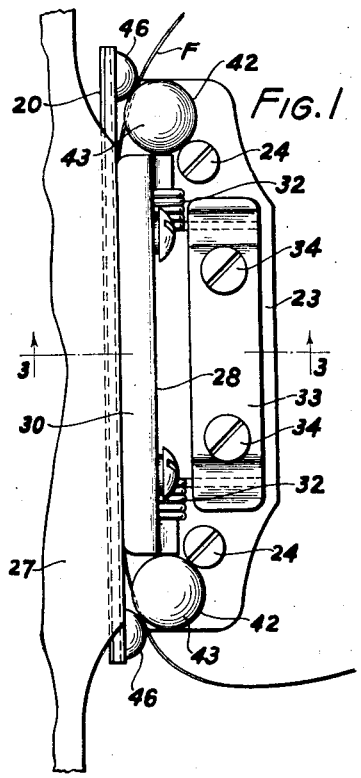
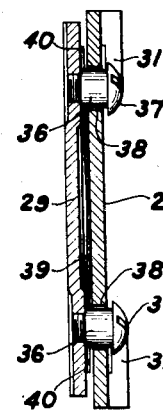
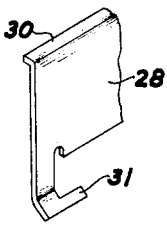
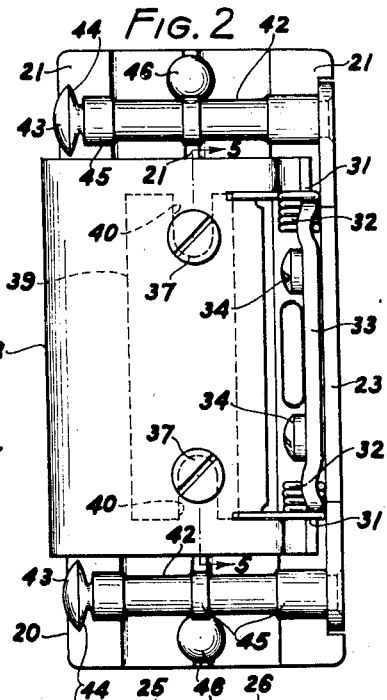
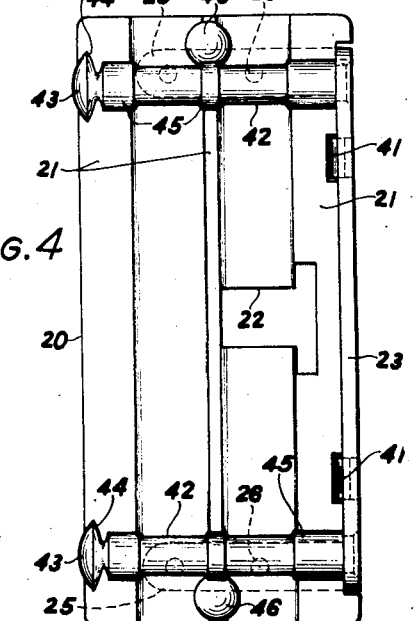
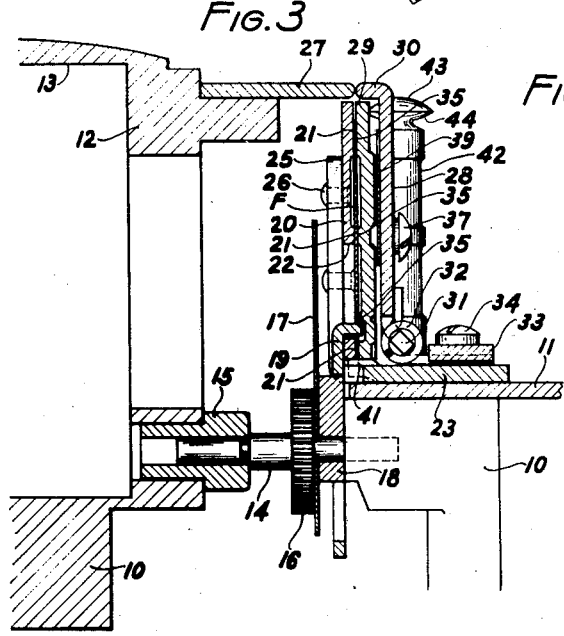
ALOYSIUS E. LECHLEITNER
INVENTOR
BY
ATTORNEYS Patented June 6, 1944

2,350,780

UNITED STATES PATENT OFFICE 2,350,780

FILM GUIDING ASSEMBLY

Aloysius E. Lechleitner, Rochester, N. Y., assignor to Eastman Kodak Company, Rochester, N. Y., a corporation of New Jersey Application December 3, 1942, Serial No. 467,815

9 Claims. (Cl. 88—17)

The present invention relates to a film guiding assembly for a film handling apparatus and more particularly to the gate construction and accessories thereto for a film handling apparatus of the sprocketless type.

The principal difficulties encountered in a sprocketless type of film handling apparatus are travel ghost caused by the take-up pulling film through the gate and unsteadiness caused by variation of the tension in the film entering the gate. It is known that both of these difficulties may be reduced or eliminated by providing snubbing members at one or both ends of the film gate and by using the inherent resiliency of the film to form resilient loops between the gate and supply and take-up film rolls.

The primary object of the present invention is the provision of a film guiding assembly which is particularly effective to provide the required snubbing action and gate tension and which simultaneously guides the film laterally to prevent weave or side unsteadiness.

Another object of the invention is the provision of posts and protuberances at either end of the film guideway to provide the necessary snubbing, edge guiding, resilient loop formation and in addition to prevent any pull from the film rolls being exerted on the pressure pad at the film gate.

A further object of the invention is the provision of a simple but effective mounting for the movable member of a film gate whereby the same may be biased as desired.

Other and further objects of the invention will be suggested to those skilled in the art by the disclosure which follows.

The above and other objects of the invention are embodied in a film handling apparatus containing a film guideway for guiding a film strip in a plane, an edge guiding means at one side of the guideway, a pair of coil springs in which the movable gate member is mounted and for urging the same toward the stationary gate member, a pair of posts respectively adjacent each end of the guideway and each having a head with an inclined undersurface for engaging one edge of the film strip to move the other edge thereof against the edge guiding means, and a means operative to direct the film moving to or from the guideway into edgewise engagement with the edge guiding means and said inclined undersurfaces of the posts. The posts function to provide a snubbing action on the film, to laterally guide the film and prevent side unsteadiness, and to prevent any direct pull from the film roll being exerted on the resilient pressure pad of the gate. Such snubbing action of the posts co-operates with the tension at the film gate created by the resilient mounting for the pressure pad to prevent longitudinal unsteadiness. The film rolls or film path may be arranged so that the film strip will be directed into the aforementioned snubbing engagement with the inclined undersurfaces of the posts but a pair of guide protuberances are preferably arranged to direct the film strip into such engagement with said undersurfaces.

Reference is hereby made to the accompanying drawing wherein similar reference characters designate similar elements and wherein Fig. 1 is a side elevation of the film guiding assembly of the invention.

Fig. 2 is a rear elevation of said film guiding assembly.

Fig. 3 is a transverse cross-section through said guiding assembly taken on the line 3—3 of Fig. 1 and showing certain parts of the apparatus.

Fig. 4 is a rear elevation of the film guiding assembly with the movable gate member or pressure pad removed.

Fig. 5 is a longitudinal section through the movable member or pressure pad and is taken on the line 5—5 of Fig. 2.

Fig. 6 is a fragmentary perspective of one end of the support member for the pressure pad.

While the film guiding assembly is illustrated herein with respect to a motion picture camera of the double 8 mm. type in which the invention is particularly effective, it must be understood that the invention is also applicable to any type of sprocketless film handling apparatus. For purposes of illustration the film guiding assembly is shown as mounted on a casing 10 which has a mechanism plate 11 and lens mount 12 provided with a socket 13. A shaft 14 is journaled at one end in casing 10 and at the other end in a bearing 15 on lens mount 12 and carries a gear 16 for engagement with a spring motor or other operating mechanism, not shown. A shutter sector 17 is mounted on shaft 14 for operation in a known manner and a cam 18 is also mounted on shaft 14 for actuation of a film pulldown claw 19 in a well understood manner.

The film guideway comprises a stationary gate member 20 having film engaging tracks 21 and is provided with an exposure aperture 22. A bracket 23 is fastened to mechanism plate 11 by bolts 24, see Fig. 1, and has upright arms 25 to which said stationary gate member 20 is fastened by rivets 26. A cover plate 27 is attached to the lens mount 12 to enclose the mechanism and overlie the edge of the stationary gate member 20.

The movable gate member comprises a support member 28 and a pressure pad 29. Said support member 28 has a flange 30 for abutting the edge of cover plate 27 when the film gate is closed. Projections 31 on rearwardly bent corners of support member 28 extend into the resilient coils of spring members 32. The ends of spring members 32 are clamped between the bracket 23 and the ends of a clamp member 33 which is fastened to said bracket 23 by screws 34. The other ends of spring members 32 lie against the back of support 28, see Figs. 2 and 3, and urge the same into the position shown in Fig. 3.

The pressure pad is also provided in a known manner with film engaging tracks 35 corresponding to the tracks 21 on the stationary gate member 20. A pair of shouldered studs 36 having heads 37 extend freely through holes 38 in support member 28 and are threaded into said pressure pad 29. A plate spring member 39 is longitudinally bowed and is placed between pressure pad 29 and support member 28, being provided in each end with notches 40 to fit around the shouldered studs 36. Thus it will be seen that the support member 28 is normally urged around the bearings formed by the coils of spring members 32 into an upright or closed position as best shown in Fig. 3 and as a result the film engaging tracks 35 of pressure pad 29 are pressed against a film F between the gate members, said pressure pad 29 being free to swing or swivel and being free to be retracted by any splices or other protuberances on the film.

An edge guiding means is provided at one side of the guideway formed by the stationary gate member 20 and pressure pad 29. Such edge guiding means may comprise embossings 41 formed out of the base of bracket 23. The film gate thus far described is satisfactory for use in a film handling apparatus having a preformed loop but would permit travel ghost, unsteadiness and weave in a sprocketless type of film handling apparatus. Such travel ghost and unsteadiness are overcome by providing a snubbing action at both ends of the film gate to prevent drag from the supply film roll or excessive torque in the take-up film roll causing undesirable movement of the film in the gate.

It is already known that such snubbing action may be provided by stationary posts located at both ends of the film gate but heretofore it has been difficult to control the amount of snubbing obtained and it has been necessary to provide additional means for edge guiding of the film to prevent weave. According to the invention the aforementioned snubbing action is obtained by the provision of posts 42 at each end of the film guideway and carrying heads 43 which have inclined undersurfaces 44. Said posts 42 are also provided in a known manner with film-engaging portions 45. The posts 42 are located so that the inclined undersurfaces 44 of heads 43 are displaced rearwardly from the plane of the film as determined by the film guideway and the standard path of the film F from the supply roll to the gate and from the gate to the take-up roll may curve said film F so as to bring the edges thereof into engagement with said undersurfaces 44 or between said undersurfaces 44 and the edge guiding embossings 41.

Although this path of the film F for engagement with undersurfaces 44 may be obtained by arrangement of the film path and film rolls, it is more reliable and preferred to provide protruding film engaging means on the opposite side of the film F from the posts 42 placed farther from the ends of the guideway than said posts 42 and extending into the film plane. As shown, hemispherical protuberances 46 are fastened to the stationary gate member 20 and, for a double 8 mm. type of apparatus, are centrally located to engage the center of the face of the film F. Since these protuberances 46 extend into and beyond the film plane they bend the film F so that its upper edge engages the inclined undersurfaces 44 whereby the other edge of the film F is brought against the surfaces of the edge guiding embossings 41. The inclination of undersurfaces 44 creates a snubbing action upon the film and the amount of snubbing may be varied by changing the inclination of undersurfaces 44 and/or by changing the height of the protuberances 46.

The combined action of the inclined undersurfaces 44, protuberances 46 and edge guiding embossings 41 prevents abnormal conditions at the supply film roll from effecting steady intermittent advancement of the film F through the gate and also prevents any drag on the supply film roll from acting against the pressure pad 29 to open the gate during film advancement. In a similar manner the undersurface 44, edge guiding embossings 41 and protuberances 46 prevent abnormal conditions at the take-up pulling the film F through the gate or from opening the spring pressed pressure pad 29. The snubbing action so provided also combines with the gate tension to prevent coasting of the film through the gate and thereby eliminates unsteadiness. Consequently, the present invention is outstanding for its simplicity and effectiveness for preventing unsteadiness, weave, travel ghost and out of focus caused by opening of the gate in a sprocketless type of film handling apparatus. It is believed that this invention is the first to combine such snubbing action with edge guiding to effectively eliminate unsteadiness and weave by the same instrumentalities and at the same time to provide such instrumentalities in a manner that they can be varied to change the characteristics of operation.

Since the present invention is susceptible of many variations, the present disclosure is to be considered as illustrative, the scope of the invention being defined by the appended claims.

Having now particularly described my invention, what I desire to secure by Letters Patent of the United States and what I claim is:

1. In a film handling apparatus, the combination with a casing, a film guideway therein for guiding a film strip in a plane and including a stationary gate member and a movable pressure means including a support having a pair of projections, and edge guiding means at one side of said guideway, of a pair of springs connected between said casing and said support for urging said movable pressure means toward said stationary gate member and having coils within which said projections are journaled, a pair of posts respectively adjacent each end of said guideway and each having a head with an inclined undersurface for engaging one edge of a film strip to move the other edge thereof against said edge guiding means, and means operative to direct the film at the end of said guideway into edgewise engagement with said edge guiding means and said inclined undersurface whereby the film is laterally located and a snubbing action created upon the film.

2. In a film handling apparatus, the combination with a casing, a film guideway therein for guiding a film strip in a plane and including a stationary gate member and a movable pressure means including a support having a pair of projections, and edge guiding means at one side of said guideway, of a pair of springs connected between said casing and said support for urging said movable pressure means toward said stationary gate member and having coils within which said projections are journaled, a pair of posts respectively adjacent each end of said guideway and each having a head with an inclined undersurface spaced from said film plane and for engaging one edge of a film strip to move the other edge thereof against said edge guiding means, and a pair of film engaging protuberances on the opposite side of the film strip and each spaced farther from said guideway than said posts, each extending into said film plane, and for bending the film strip entering and leaving the guideway into snubbing engagement between said inclined undersurface and said edge guiding means.

3. A film handling apparatus comprising a guideway for a film strip, edge guiding means at one side of said guideway, and a post adjacent the end of said guideway and having a fixed head with an inclined undersurface for engaging one edge of a film strip to move the other edge thereof against said edge guiding means and for creating a snubbing action on said film strip.

4. A film handling apparatus comprising a guideway for guiding a film strip in a plane, edge guiding means at one side of said guideway, a post adjacent the end of said guideway, and having a head with an inclined undersurface for engaging one edge of a film strip to move the other edge thereof against said edge guiding means, said inclined undersurface being spaced from the plane of the film strip, and means operative to direct the film at the end of said guideway into engagement with said inclined undersurface of the headed post.

5. A film handling apparatus comprising a guideway for guiding a film strip in a plane, edge guiding means at one side of said guideway, a post adjacent the end of said guideway, and having a head with an inclined undersurface for engaging one edge of a film strip to move the other edge thereof against said edge guiding means, said inclined undersurface being spaced from the plane of the film strip, and film engaging means on the opposite side of the film strip and spaced farther from said guideway than said post, extending into said film plane, and for bending the film strip beyond the guideway into engagement with said inclined undersurface of the headed post.

6. A film handling apparatus comprising a guideway for a film strip, edge guiding means at one side of said guideway, a post adjacent the end of said guideway and having a head with an inclined undersurface for engaging one edge of a film strip to move the other edge thereof against said edge guiding means, and a protruding film engaging means on the opposite side of the film strip from said post and farther from said guideway and engaging the face of the film strip along its center line to direct the film strip entering or leaving the guideway into engagement with said inclined undersurface of the headed post.

7. A film handling apparatus comprising a guideway for a film strip, edge guiding means at one side of said guideway, a pair of posts; one adjacent each end of said guideway, and each having a head with an inclined undersurface for engaging one edge of a film strip to move the other edge thereof against said edge guiding means, and a pair of film engaging hemispheres on the opposite side of the film strip, each spaced farther from said guideway along the film path than said posts, and each engaging the face of the film strip along its center line to direct the film strip entering and leaving the guideway into engagement with said inclined undersurface of the headed post.

8. A film handling apparatus comprising a casing, a film guideway therein including a stationary gate member and a movable pressure means including a support member having a pair of projections, and a pair of spring members each having one end attached to said casing and the other end attached to said support member, and each having an intermediate coil in which said projections are journaled.

9. A film handling apparatus comprising a casing, a film guideway therein including a stationary gate member and a movable pressure means including a support member having a pair of projections, and a pair of spring members each having one end attached to said casing and the other end attached to said support member, and each having an intermediate coil biased to urge said movable pressure means toward said stationary gate member and within which coils the projections of said support member are journaled.

ALOYSIUS E. LECHLEITNER.